:

US008224329B2

(12) United States Patent
Van Lieshout et al.

(10) Patent No.: US 8,224,329 B2
(45) Date of Patent: Jul. 17, 2012

(54) METHOD FOR MEASURING HOME CELL IN MOBILE COMMUNICATION SYSTEM

(75) Inventors: Gert-Jan Van Lieshout, Middlesex (GB); Himke Van Der Velde, Middlesex (GB)

(73) Assignee: Samsung Electronics Co., Ltd (KR)

( * ) Notice: Subject to any disclaimer, the term of this patent is extended or adjusted under 35 U.S.C. 154(b) by 1020 days.

(21) Appl. No.: 12/147,134

(22) Filed: Jun. 26, 2008

(65) Prior Publication Data
US 2009/0005031 A1 Jan. 1, 2009

(51) Int. Cl.
H04W 4/00 (2009.01)
(52) U.S. Cl. ......... 455/436; 455/425; 455/455; 370/335
(58) Field of Classification Search .......... 455/436, 455/455, 425; 370/337
See application file for complete search history.

(56) References Cited

U.S. PATENT DOCUMENTS

| 6,058,302 | A | 5/2000 | Westerberg |
| 6,178,326 | B1 * | 1/2001 | Kalliokulju ............ 455/437 |
| 6,529,491 | B1 | 3/2003 | Chang et al. |
| 6,785,536 | B1 | 8/2004 | Lee et al. |
| 6,801,772 | B1 | 10/2004 | Townend et al. |
| 6,826,414 | B1 * | 11/2004 | Reynolds et al. ......... 455/555 |
| 7,171,216 | B1 * | 1/2007 | Choksi ............... 455/456.1 |
| 2007/0097938 | A1 | 5/2007 | Nylander et al. |
| 2007/0105568 | A1 | 5/2007 | Nylander et al. |
| 2009/0180447 | A1 | 7/2009 | Kim et al. |

FOREIGN PATENT DOCUMENTS

| JP | 11-164344 | 6/1999 |
| JP | 2002-532989 | 10/2002 |
| JP | 2005-117269 | 4/2005 |
| JP | 2006-135716 | 5/2006 |
| JP | 2008-507217 | 3/2008 |
| WO | WO 02/093955 | 11/2002 |
| WO | WO 2006/020168 | 2/2006 |

OTHER PUBLICATIONS

Nokia Siemens Networks, "Home NodeB/eNodeB Deployment Scenarios and Requirements", TSG-RAN Working Group 4 (Radio) Meeting #42bis Sophia Antipolis, France, Apr. 2-4, 2007.
3rd Generation Partnership Project; Technical Specification Group Radio Access Network; Evolved Universal Terrestrial Radio Access (E-UTRAN); Overall Description; Stage 2, (Release 8) 3GPP TS 36.300 V8,3.0, Dec. 2007.

* cited by examiner

Primary Examiner — Pierre-Louis Desir
(74) Attorney, Agent, or Firm — The Farrell Law Firm, P.C.

(57) ABSTRACT

Disclosed is method for measuring a home cell in a mobile telecommunications system comprising: a network including a plurality of base stations for defining communications cells; and first and second user equipment for communicating with the network, said plurality of base stations including at least one home base station defining a home cell associated with said first user equipment and not with said second user equipment, said home cell overlapping in coverage with a communications cell usable by both said first and second user equipment, the method including the steps of: acquiring, at the network, position data indicative of the position of the first user equipment; determining whether the first user equipment is close to the home cell by using the acquired position data; sending a cell measurement control message from the network to the first user equipment via a base station specifying measurements of said home cell; performing, at the first user equipment a fine position measurement; determining at the first user equipment whether the first user equipment is close to the home cell, based on said fine position measurement; and taking measurements of said home cell at the first user equipment when the first user equipment is close to the home cell.

9 Claims, 10 Drawing Sheets

METHOD FOR MEASURING HOME CELL IN MOBILE COMMUNICATION SYSTEM

BACKGROUND OF THE INVENTION

1. Field of the Invention

This invention relates to wireless communication systems, and more particularly to a method and an apparatus for measuring a home cell, which can control measurement and reporting of the quality of wireless links. Such measurements are commonly a significant factor in determining whether or not a handover procedure should be performed.

2. Description of the Related Art

At present, an Evolved Universal Terrestrial Radio Access (E-UTRA) scheme is being specified. Some details of E-UTRA have already been agreed (e.g., specification 3GPP TS 36.300 "Evolved Universal Terrestrial Radio Access (E-UTRA) and Evolved Universal Terrestrial Access Network (E-UTRAN); Overall description; Stage 2", Release 8).

The E-UTRA scheme, like other existing wireless telecommunications systems, includes a network having a plurality of wireless base stations, i.e., enhanced node Bs (which is also called "eNodeBs" or "eNBs" and will be hereinafter referred to as "eNBs") in wireless communication with a plurality of user equipment (typically, mobile terminals such as mobile telephone handsets, PDAs, and so on). The base stations define cells, each available for communication over a limited geographical area in order to allow for channel re-use. Measurement reporting in such a system is described in our earlier application number GB0700555.6, filed on 11 Jan. 2007 (agents ref J49460GB), incorporated herein by reference. The network sends measurement control messages to the user equipment, specifying which cells to measure. Making the measurements by a UE uses up UE battery power, and requires gaps in transmission/reception.

It has been proposed to employ home or private network cells, forming part of or inter-working with the wireless communication system. The home or private cells are generated by home NodeBs or home eNodeBs. Whilst the details of such home eNodeBs have not yet been completely finalized, it is envisaged (for example in 3GPP document R4-070339, "Home NodeB/eNodeB deployment scenarios and requirements") that they should be deployed in indoor home environments or small office environments such as home use in a single home, home use in a multi-floor house, small and large office use, use at fairs and so on. They thus generate low power, small cells (i.e., picocells, or femtocells) available over only a very small area.

The areas covered by such home cells typically overlap with those of other cells (by way of contrast, "macrocells"). However, they are accessible only by limited sub-sets of user equipment. For example, if the home cell is deployed in a home, then only user equipment associated with residence of the home can use the home cell; if the home cell is on the premises of a business, only user equipment owned by the business can access the home cell, and so on. For those authorized users, use of the home cell may give improved reception in the indoor areas where the user is often present. There are also benefits for other network users, since the use of the home cell unloads traffic from the macrocells of the network. Thus, it is desirable for user equipment which can use a home cell to do so. Also, mechanisms are desirable for causing such user equipment when idle to preferentially register with a home cell it can use, and for causing such user equipment when active to be handed over to such a home cell.

At the same time, it is desirable to make the home ENBs or NodeBs as compatible as possible with other network equipment. One possibility is to provide the home cells on a channel (e.g. frequency) or set of channels that are not otherwise used by the network.

Since home cells will be relatively small, user equipment may encounter significant numbers of home cells which it is not authorized to use. Taking measurements of the signal strength available from such cells, and reporting such measurements to the network, are therefore pointless tasks which both reduce the availability of the user equipment for other purposes and generate unnecessary signaling overheads, using up network capacity.

SUMMARY OF THE INVENTION

Accordingly, the present invention has been made to solve the above-mentioned problems occurring in the prior art, and the present invention provides a method and an apparatus for measuring a home cell, which can control measurement and reporting of the quality of wireless links. Such measurements are commonly a significant factor in determining whether or not a handover procedure should be performed.

In accordance with an aspect of the present invention, there is provided a method for measuring a home cell in a mobile telecommunications system comprising: a network including a plurality of base stations for defining communications cells; and first and second user equipment for communicating with the network, said plurality of base stations including at least one home base station defining a home cell associated with said first user equipment and not with said second user equipment, said home cell overlapping in coverage with a communications cell usable by both said first and second user equipment, the method including the steps of: acquiring, at the network, position data indicative of the position of the first user equipment; determining whether the first user equipment is close to the home cell by using the acquired position data; sending a cell measurement control message from the network to the first user equipment via a base station specifying measurements of said home cell; performing, at the first user equipment a fine position measurement; determining at the first user equipment whether the first user equipment is close to the home cell, based on said fine position measurement; and taking measurements of said home cell at the first user equipment when the first user equipment is close to the home cell.

In accordance with another aspect of the present invention, there is provided a method for measuring a home cell in a mobile telecommunications system comprising: a network including a plurality of base stations for defining communications cells; and first and second user equipment for communicating with the network, said plurality of base stations including at least one home base station defining a plurality of home cells, at least one associated with said first user equipment and not with said second user equipment, said home cell overlapping in coverage with a communications cell usable by both said first and second user equipment, the method including the steps of: acquiring position data indicative of the position of the first user equipment; determining whether the first user equipment is close to the home cell by using the acquired position data; sending a measurement control message from the network to the first user equipment via a base station relating to said home cell when the first user equipment is close to the home cell; and taking measurements of said home cell at the first user equipment in dependence on a received said measurement control message; wherein, on setting up or transferring to a base station a session involving said first user equipment, position information on the position of a said home cell within the area of the communication cell generated by that base station is sent to the base station.

In accordance with another aspect of the present invention, there is provided a method for measuring a home cell in order to transfer a user equipment from a communications cells operated by a source base station to a said home cell operated by a target home base station in a mobile telecommunications system comprising: a network including a plurality of base stations for defining communications cells; and first and second user equipment for communicating with the network, said plurality of base stations including at least one home base station defining a home cell associated with said first user equipment and not with said second user equipment, said home cell overlapping in coverage with a communications cell usable by both said first and second user equipment, the method including the steps of: transferring, from said user equipment via said source base station to said target home base station, security information; validating, by said target home base station, whether said user equipment is authorized to connect to a cell using the security information; and accepting, by said target home base station, connection establishment of said user equipment when said user equipment is authorized to connect to said cell.

In accordance with another aspect of the present invention, there is provided a method for measuring a home cell in order to restrict reporting of cell measurements of said home cells from said first user equipment to said network in a mobile telecommunications system comprising: a network including a plurality of base stations for defining communications cells; and first and second user equipment for communicating with the network, said plurality of base stations including at least one home base station defining a home cell associated with said first user equipment and not with said second user equipment, said home cell overlapping in coverage with a communications cell usable by both said first and second user equipment, the method including the steps of: signaling a measurement control message from said first user equipment; making a plurality of cell measurements at said first user equipment; for each said measurement, validating whether said first user equipment is entitled to access the cell; and deciding whether to report said cell measurement depending on said validating step.

In accordance with another aspect of the present invention, there is provided a method for operating a telecommunications network in order to measure a home cell in a mobile telecommunications system comprising: a network including a plurality of base stations for defining communications cells; and first and second user equipment for communicating with the network, said plurality of base stations including at least one home base station defining a home cell associated with said first user equipment and not with said second user equipment, said home cell overlapping in coverage with a communications cell usable by both said first and second user equipment, the method including the steps of: signaling a measurement control message from the network to user equipment, wherein said measurement control message includes a field instructing said first user equipment to enter a restricted reporting mode, in which said first user equipment performs cell measurement for a plurality of cells, validates based on the cell measurement whether said first user equipment is authorized to access said cell, and determines based on the validation whether to report the cell measurement.

In accordance with another aspect of the present invention, there is provided a method for measuring a home cell in a cellular network including the steps of: sending to a user equipment a signal to indicate that it may measure and report a home cell channel; providing first user equipment which, on receipt of such a signal, will measure and report said home cell channel; and providing second user equipment capable of making fine position measurements which, on receipt of such a signal, will make said fine position measurements and only measure and report said home cell channel when detected to be close thereto.

In accordance with another aspect of the present invention, there is provided a method for measuring a home cell in a cellular network including the steps of: sending to a user equipment a control message to indicate that it may measure and report a home cell channel: and providing user equipment which, on receipt of a control message, can measure and report said home cell channel, wherein the network is arranged to forward position information on the position of a said home cell which the user equipment is entitled to use to each base station with which the user equipment is registered, to allow detection of when said user terminal is close to said home cell and to restricting measurement of home cells based on said detection.

In accordance with another aspect of the present invention, there is provided a method for operating a cellular network for home cell measurement including the step of: allowing validation of a user equipment directly with a said home cell on handover thereto from a network cell, using security information associated with that user equipment which is transferred from said cellular network to said home cell from said network cell on handover.

In accordance with another aspect of the present invention, there is provided a method for measuring a home cell in a cellular network including the step of: sending user equipment a signal indicating that it should, for any measurements of a given channel corresponding to a home cell, determine whether it is entitled to use said home cell and to use said determination in deciding whether to report said measurement.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Hereinafter, exemplary embodiments of the present invention will be described with reference to the accompanying drawings. In the following description, various specific definitions found in the following description are provided only to help general understanding of the present invention, and it is apparent to those skilled in the art that the present invention can be implemented without such definitions.

First Embodiment

The first embodiment will be described in the context of a wireless communication system incorporating the proposed Evolved Universal Terrestrial Radio Access Network (E-UTRAN).

Figure 1:
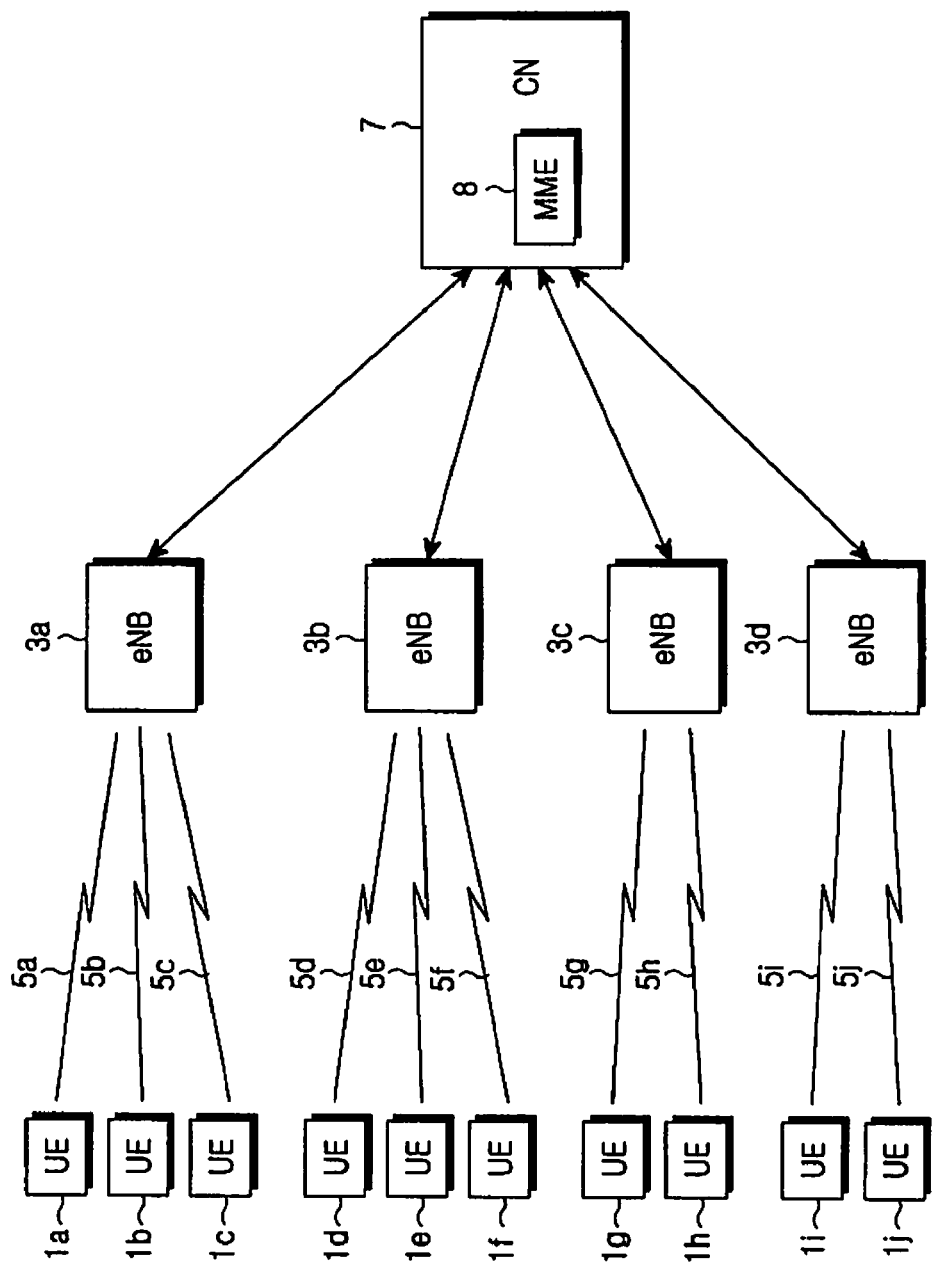
FIG. 1 is a view illustrating the main components of a wireless communication system according to a first embodiment of the invention.

FIG. 1 is a view illustrating the main components of a wireless communication system according to a first embodiment of the invention.

As shown in FIG. 1, in a wireless communication system, a plurality of user equipment (UE) 1a-1j communicate with respective enhanced Node B base stations (eNBs) 3a-3j via radio links 5a-5j.

In the first embodiment according to the present invention, the UEs 1a to 1j (hereinafter, referred to as "1") are cellular phones. eNBs 3a to 3d (hereinafter, referred to as "3") are connected directly to the core network 7, respectively. The eNBs 3 are also connected to each other, and to at least one Mobility Management Entity (MME) 8 tracking the location of the UEs 1 to localize their position to within a Tracking Area (TA), for example, in order to route incoming calls thereto.

In the first embodiment according to the present invention, the UEs 1 are also able to communicate with other radio access technologies (RATs) (e.g., the standard Universal Terrestrial Radio Access Network (UTRAN) and the Global System for Mobile communications (GSM) network). In this way, during implementation of the E-UTRAN the UEs can still work in areas without eNBs but with base stations of such other networks.

Figure 4:
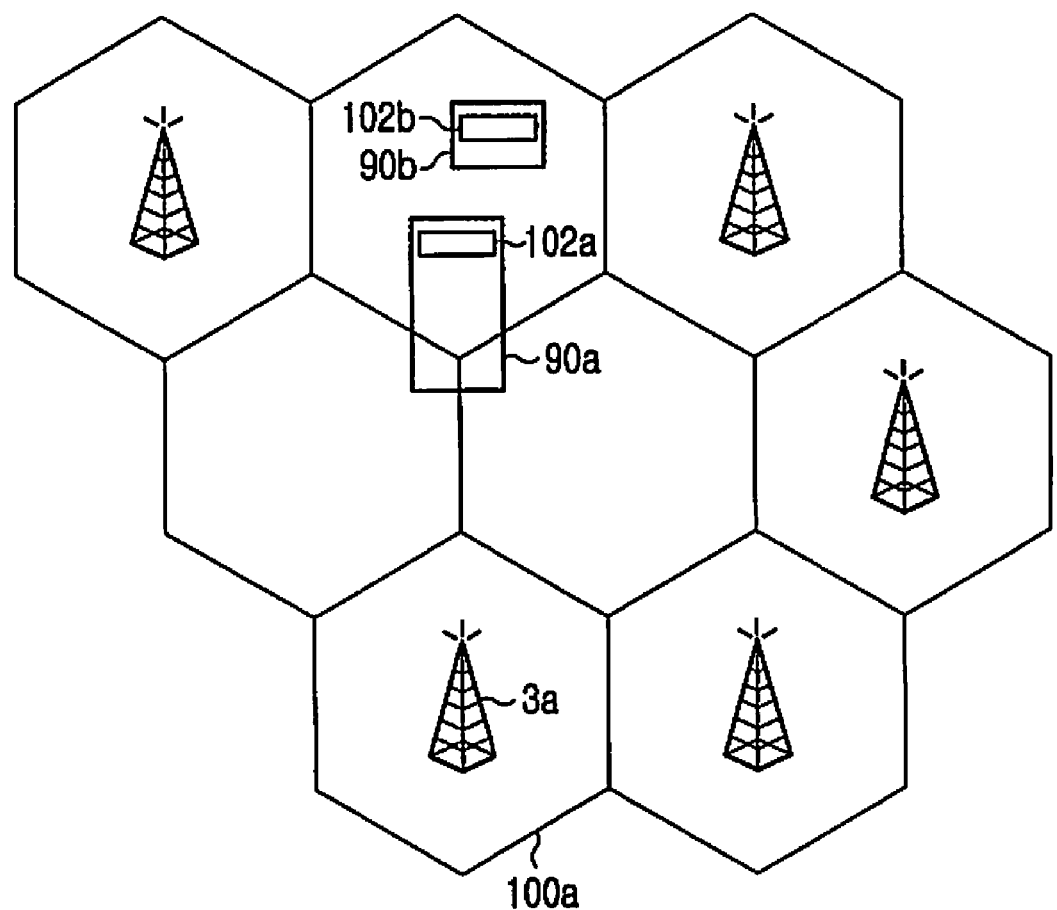
FIG. 4 is a diagram illustrating the overlap of cells and home/private cells.

FIG. 4 is a diagram illustrating the overlap of cells and home/private cells.

As shown in FIG. 4, the network comprises a plurality of cells 100a, 100b, etc provided by the eNBs 3. These cells ("macro-cells") are shown conventionally as contiguous. However, in reality, their coverage may overlap so that shadowing and line-of-sight blockages do not result in interruption of cover. First and second Home/private cells 102a and 102b are provided in respective different buildings 90a and 90b corresponding to first and second small businesses, by respective home eNBs (not shown). These home cells are provided on a dedicated frequency for Home/private cells. In other respects, the home eNBs are similar to eNBs 3 but transmit at lower power levels.

Each eNB 3 communicates with UEs 1 in one or more cells it broadcasts. As a UE 1 in an active communications mode moves, communication is handed over between cells. In the first embodiment according to the present invention, the E-UTRAN determines when a handover procedure takes place and to which cell the communication is handed over, taking into account radio link quality factors and data traffic management factors. All UEs 1 can communicate with any of the eNBs 3.

A first group of UEs 1a to 1c are owned by employees of the first business and a second group of UEs 1d-1f are owned by employees of the second business. Although only home cells 102a,102b are shown, the first business may have a further home cell (not shown) at another location, also usable by the first group of UEs 1a-1c.

In order to measure radio link quality factors, the UE 1 performs various measurements. For some of these measurements, the UE 1 is unable to listen for data or to transmit data at the same time, for example because the measurement is being performed in a different frequency range (an inter-frequency measurement) or the measurement is for a different radio access technology (an inter-RAT measurement). In order to allow such measurements to take place, a number of transmission and reception gaps are introduced into the existing radio link during which the UE 1 is free to perform measurements without having to monitor for or transmit data. When the UE 1 is connected to the E-UTRAN, the gap configuration is selected by the UE 1 from a set of candidate gap configurations provided by the E-UTRAN.

Figure 2:
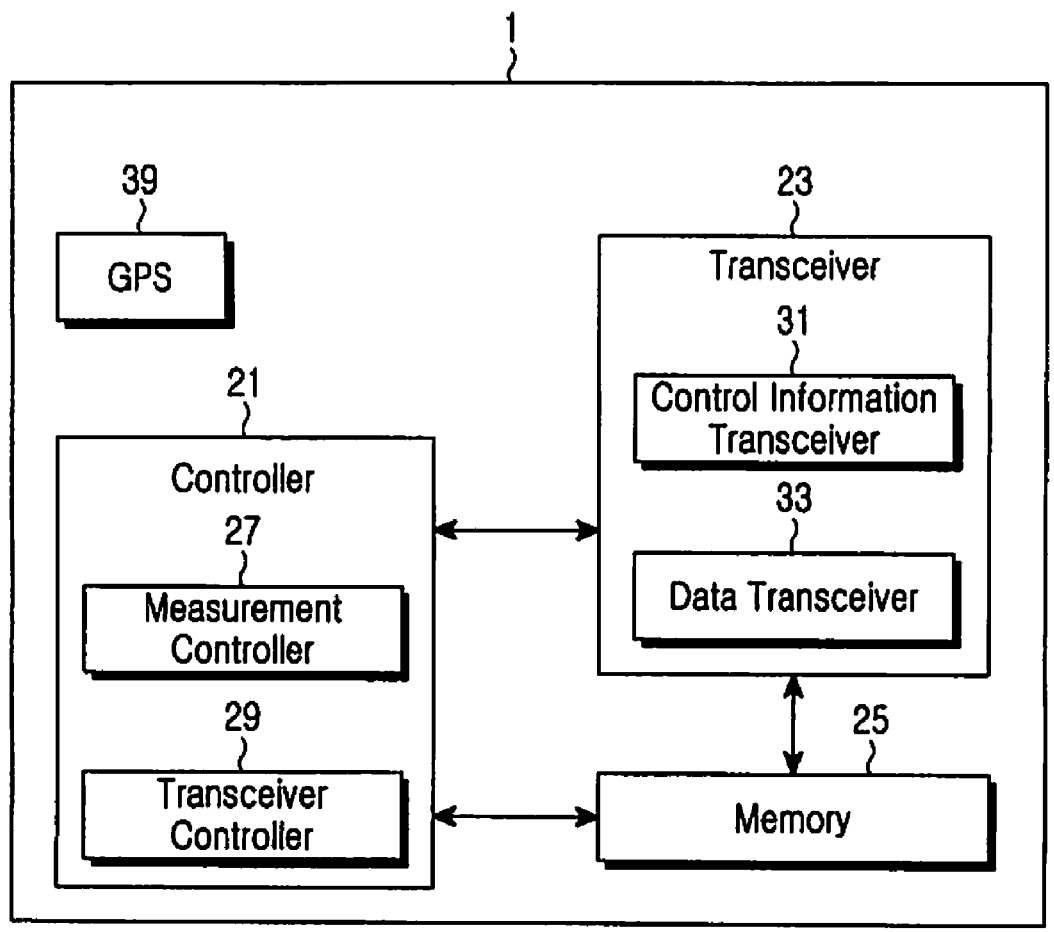
FIG. 2 is a block diagram illustrating the main components of user equipment according to the first embodiment of the present invention.

FIG. 2 is a block diagram illustrating the main components of UE 1 according to the first embodiment of the present invention. Other components, such as an antenna, a microphone, a battery, a speaker, a display and a keypad, which are not related to the present invention are not shown in FIG. 2 for clarity of illustration of the first embodiment of the present invention.

As shown in FIG. 2, the UE 1 has a controller 21, a transceiver 23 and memory 25. The controller 21 includes a measurement controller 27, which controls radio link quality measurements, and a transceiver controller 29, which controls operation of the transceiver 23. The transceiver 23 includes a control information transceiver 31, which handles the communication of control data with the eNB 3 and reception of control data from the eNB 3, and a data transceiver 33, which handles the communication of user data with the eNB 3 and the reception of user data from the eNB 3. Also provided, in those UEs 1a-1c,1d-1f which are for communication with respective Home/private cells 102a, 102b,are position measurement devices 39 e.g. GPS satellite navigation position measurement devices.

Figure 3:
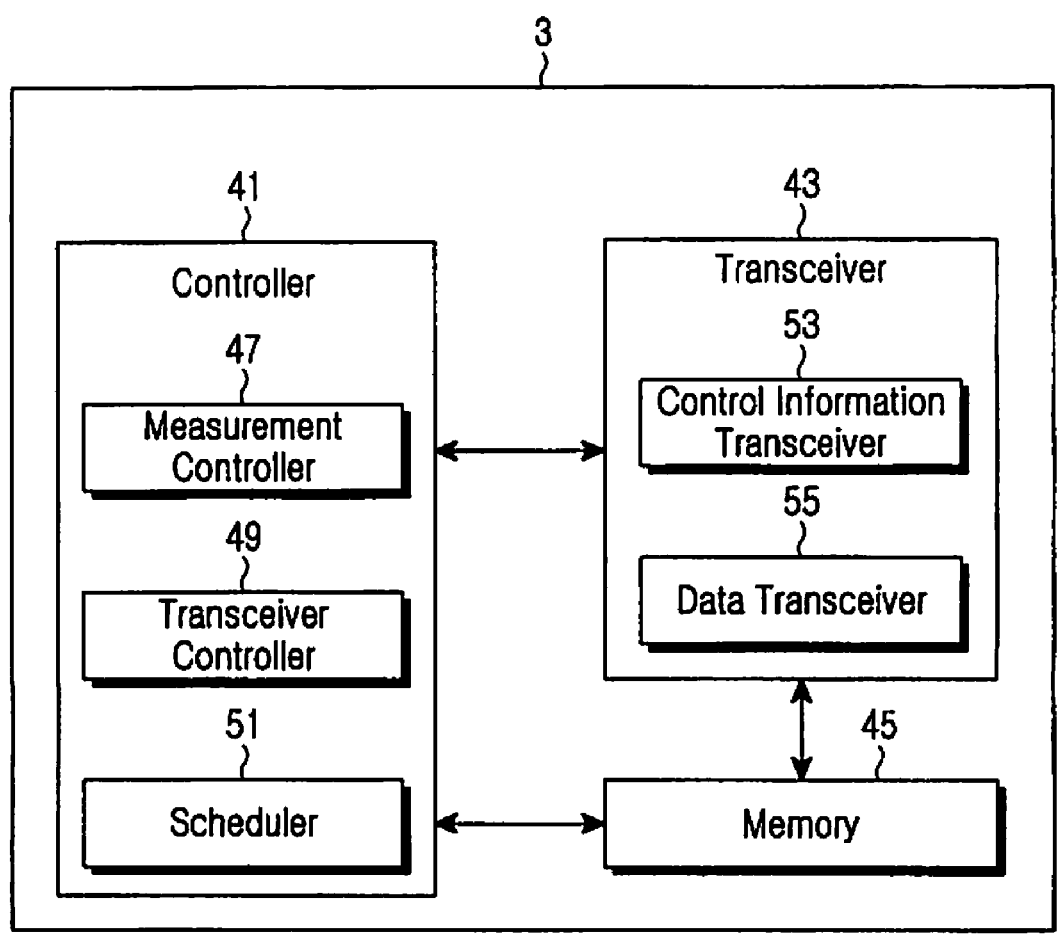
FIG. 3 is a block diagram illustrating the main components of an enhanced Node B (eNB) according to the first embodiment of the present invention.

FIG. 3 is a block diagram illustrating the main components of an enhanced Node B (eNB) according to the first embodiment of the present invention. As shown, the eNB 3 has a controller 41, a transceiver 43 and memory 45. The controller 41 includes a measurement controller 47, which controls radio link quality measurements performed by the eNB 3, a transceiver controller 49, which controls operation of the transceiver 43, and a scheduler 51. These are provided by one or more computers, operating on data and programs in the memory 45. The transceiver 43 includes a control information transceiver 53, which handles the communication of control data with UEs 1, and a data transceiver 55, which handles the communication of user data with UEs 1. Other components, such as antennas, power supplies and so on, are omitted for clarity.

Figure 5A:
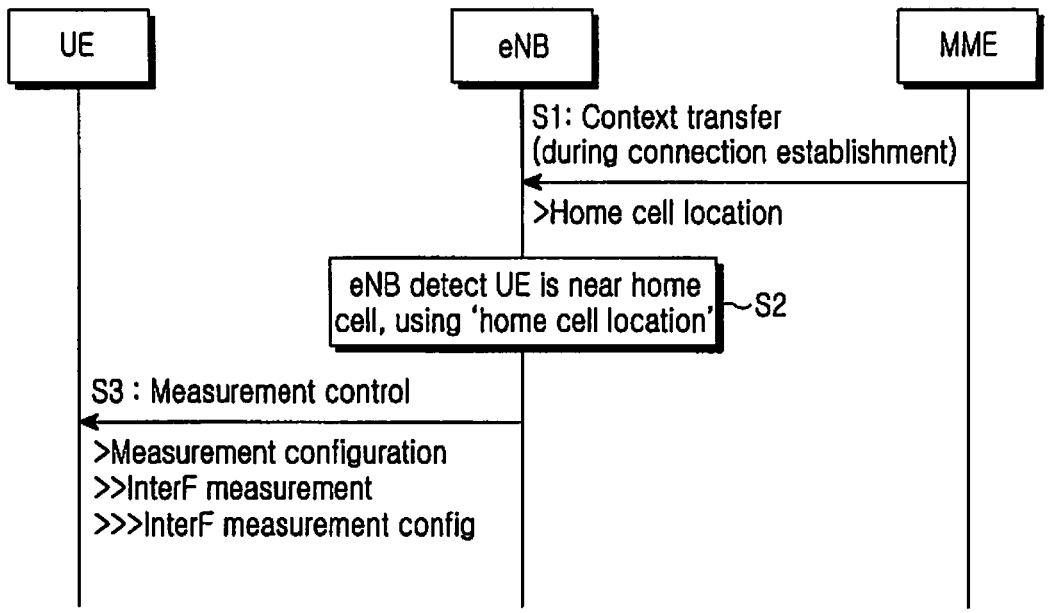
FIG. 5A is a flow diagram illustrating the signaling between a user equipment, a mobility management entity and an eNB base station forming part of the network of FIG. 1 in a first embodiment of the present invention.
Figure 6A:
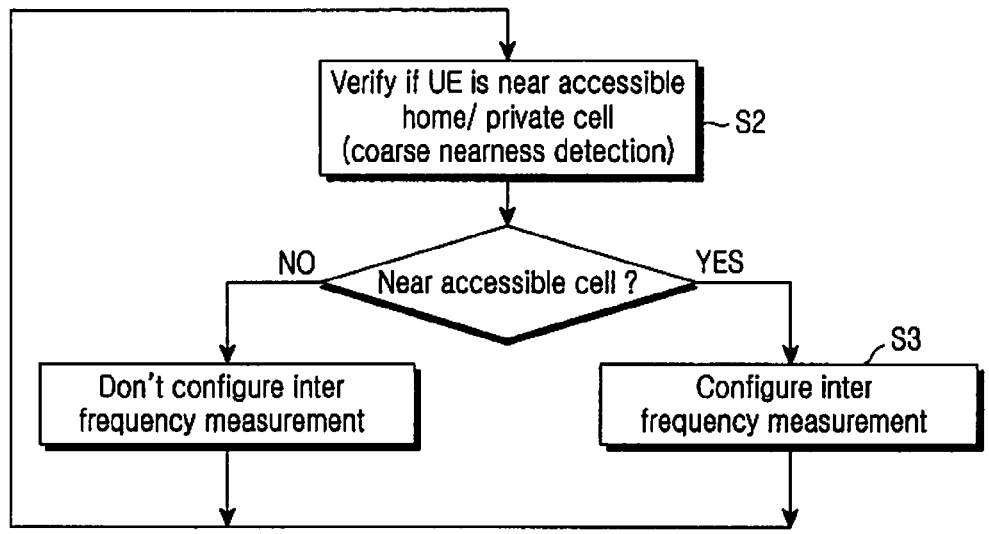
FIG. 6A is a flowchart illustrating the process performed at the eNB.

Referring to FIGS. 5A and 6A, the process performed in the first embodiment of the present invention will now be described.

FIG. 5A is a flow diagram illustrating the signaling between a user equipment, a mobility management entity and an eNB base station forming part of the network of FIG. 1 in a first embodiment of the present invention.

In step S1, as part of the context transfer during connection establishment, the MME 8 provides the eNB 3 with information about the home cell location in different ways (e.g., Target Area (TA) or regular/public/macro cell that overlaps the home cell, or geographical coordinates).

In step S2, The eNB 3 detects that the UE 1 is near the home cell location based on the transferred home cell location information.

In step S3, the network initiates a measurement control message when it wants to setup, modify or release the measurement of particular neighboring cells to be performed by the UE. More specifically, the network indicates the new configuration the UE shall apply for the measurement of frequency used for home/private cells.

A measurement control message shown in Table 1 below is transmitted as a shared message:

TABLE 1

| Information Element/Group name | Need | Description |
|---|---|---|
| Message Type | MP | |
| RRC transaction identifier | MP | |
| Integrity check info | CH | |
| Measurement identity | MP | Identifies the measurement |
| Measurement command | MP | Indicates if the message is used to setup, modify or release a measurement |
| Measurement configuration | CV | Included in case the 'Measurement command' is set to setup or modify |
| >Inter frequency measurement | OP | |
| >>Inter frequency measurement configuration parameters | OP | |
| >>UE controlled restriction of measurement area allowed | OP | Indicating if the UE is allowed to activate the measurement in a restricted area i.e. when the UE knows it is in the close vicinity of an accessible home/private cell |
| >Other type of measurement(s) | OP | |
| Additional parameters | OP | e.g. reporting mode |

The measurement control message in Table 1 is intended to be interpreted by the UE 1 as an instruction to begin measurement on the home cell. In the first embodiment according to the present invention, the measurement control message includes an additional element (shown in italics in Table 1), indicating that the UE can further restrict the geographical area within which it measures the home cell.

Figure 5B:
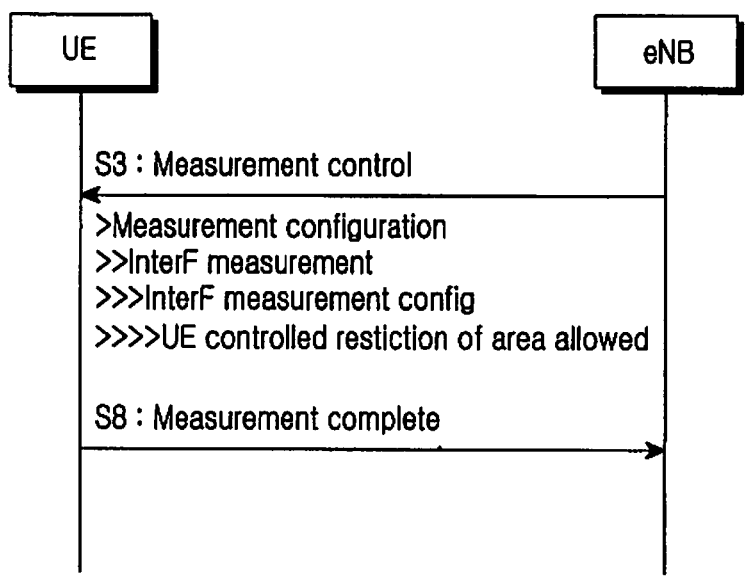
FIG. 5B is a flow diagram illustrating stages of the signaling between a user equipment and an eNB base station in the process of FIG. 5A.
Figure 6B:
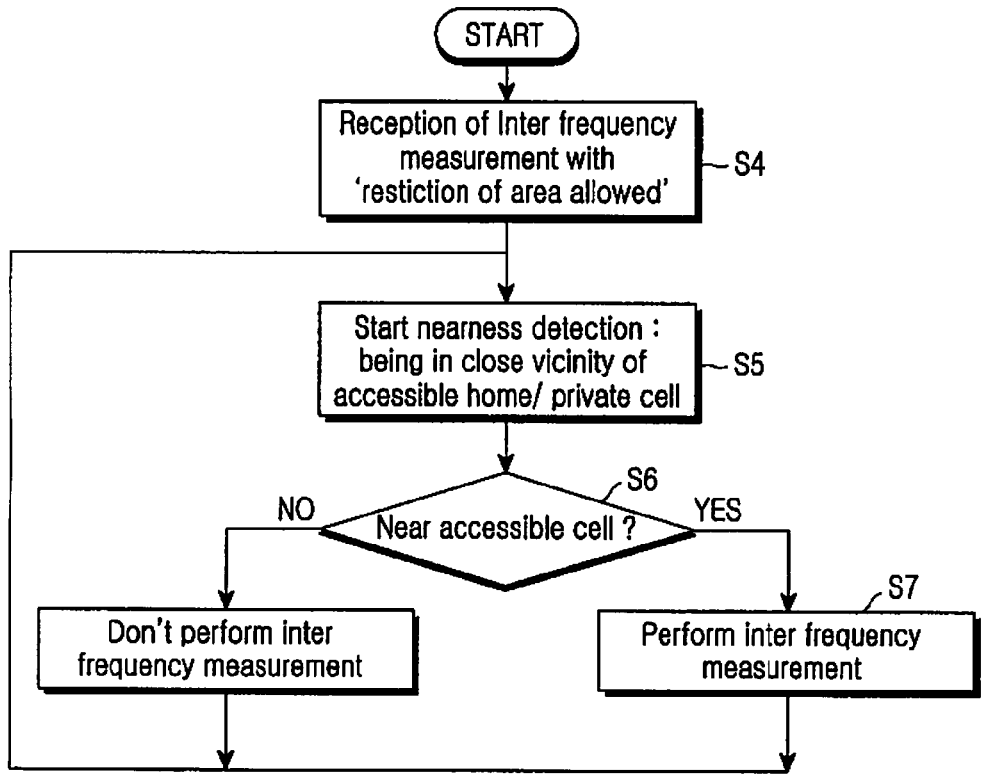
FIG. 6B is a flowchart illustrating the process performed at the user equipment.

FIG. 5B is a flow diagram illustrating stages of the signaling between a user equipment and an eNB base station in the process of FIG. 5A, and FIG. 6B is a flowchart illustrating the process performed at the user equipment.

Referring to FIGS. 5B and 6B, the UE1 receives the measurement control message between frequencies within allowed area in step S4. In step S5, the UE 1 begins to detect if it is in the close vicinity of an accessible home/private cell. In step S6, the UE 1 verifies the configuration included in the measurement control message. As a result of the detection in step S5, when it is in the close vicinity of an accessible home/private cell, the UE1 performs inter-frequency measurement. In contrast, when it is not in the close vicinity of an accessible home/private cell, the UE 1 does not perform inter-frequency measurement in step S7. That is, when the UE 1 is in the close vicinity of the accessible home/private cell, it returns a "measurement complete response message" shown in Table 2 to confirm successful set up, modification or release of a measurement. The measurement complete response message shown in Table 2 below is transmitted on a shared channel.

TABLE 2

| Information Element/Group name | Need | Description |
|---|---|---|
| Message Type | MP | |
| RRC transaction identifier | MP | |
| Integrity check info | CH | |
| Measurement identity | MP | Identifies the measurement |

In the first embodiment of the present invention, the memory 25 of the UE contains data defining a geographical area which corresponds to the location of each home cell 102*a* to which the user equipment la can gain access. The data may, for example, correspond to the corners of the building 90*a* within which the home cell 102*a* is located.

At the user equipment, on receipt of the message of Table 1 in step S4, the UE la starts position measurement using the GPS device 39. Position measurement results are periodically provided by the GPS unit 39. The periodicity is preferably determined and varied depending on factors such as how close to the home cell the last reading was, whether the last two readings indicate movement towards or away from the home cell, the rate of movement towards/away from the home cell and so on.

The position measurement results are compared with the home cell position data stored in the memory 25 and, if the reported position lies inside the home cell area defined in the memory in step S6, the UE 1*a* starts to make channel measurements on the home cell frequency, and reports the measurement to the eNB 3*a* with which it is communication.

In operation, therefore, a UE la which can communicate with a home cell 102*a* is informed by the eNB 3*b* that it is in the rough vicinity of the home cell 102*a* when it is in the macrocell 100*b*. If, as shown in FIG. 2, the user terminal 102*a* has a GPS unit 39, then it will function as described above to detect when it is in the precise vicinity of the home cell 102*a*,and commence taking and reporting measurements of that cell only at that time.

Thus, such a UE 1*a* does not waste resources or bandwidth by measuring home cells 102*b* with which it cannot communicate, but does measure home cells with which it can communicate. Further, it does not need to interrupt transmission or reception with measurement gaps to make measurements of inaccessible home cells. On the other hand, the UE conserves battery life by not using the GPS for fine position measurement until informed by the network that it is in the approximate position of a home cell 102*a* which it is authorized to use.

The combination of coarse position determination (by the network) to trigger fine position determination (by the UE) therefore combines economy in measurement of the home cell with battery and other resource saving on the UE 1*a*.

The arrangement is also interoperable with other UEs which lack fine positioning mechanisms 39. In the case of such a UE 1*b* which is authorized to use the home cell 102*a*, home cell measurements may be initiated on receipt of the measurement control message of Table 1. Thus, in the first embodiment of the present invention, the action performed in response to the measurement control message is up to the UE, dependent upon its position measurement capacities.

Whilst it is preferred to use both coarse positioning (by the network) and fine positioning (by the UE) in combination as described above, aspects of the above described embodiment can be used without fine positioning by the UE. For example, the feature that the home cell location information is provided to the target eNB during the context transfer which occurs on establishing a connection or handing over a connection to that eNB (typically through the MME but possibly from the previous eNB) is advantageous, since each eNB only needs to retain information required to service those mobiles in its area. Position and authorization information on all home cells can be retained and updated centrally, or local to each user, and provided as needed to the eNBs. In this case, the location in which the positioning takes place is less relevant; for example, the eNB could instruct the UE to commence position measurement, get a report of position from the UE indicating that it is near the home cell, and then end the UE the measurement control message to measure the home cell frequency.

Second Embodiment

In a second embodiment of the present invention, provision is made for determining whether a UE is authorized to access a give home cell when it attempts to move towards it. To minimize the signaling load on the network, the validation is performed directly between the UE 1*a* and the home eNB (although other base stations 3 may provide limited support such as the transparent transfer of information). Operation of this embodiment in idle mode and connected mode of the UE will now be discussed.

Idle Mode

Figure 7:
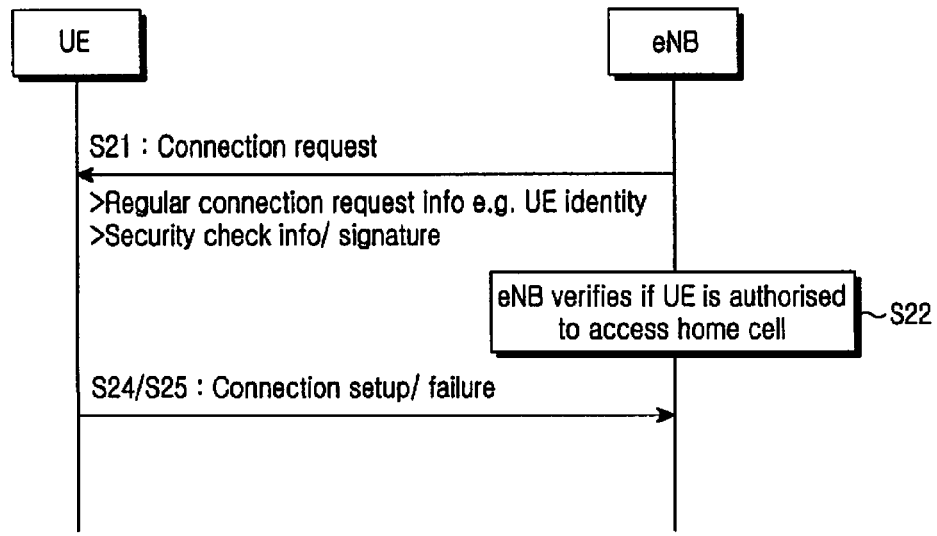
FIG. 7 is a flow diagram illustrating stages of the signaling between a user equipment in idle mode and an eNB base station forming part of the network of FIG. 1 in a second embodiment of the present invention.

FIG. 7 is a flow diagram illustrating stages of the signaling between a user equipment in idle mode and an eNB base station forming part of the network of FIG. 1 in a second embodiment of the present invention.

Referring to FIG. 7, the home/private eNB validates the UE upon connection establishment e.g. as follows:

When initiating connection establishment on a home/private cell, the UE 1*a* provides security information, based on information exchanged during initialization/authorization, to the home eNB 9*a* within the connection request, in step S21;

The home eNB 9*a* uses the security information to verify if the UE 1*a* is authorized to access the home/private cell in step S22;

If the UE is authorized the eNB accepts the connection establishment and signals back to the UE to indicate the connection in step S24. Otherwise, if the validation fails, the home eNB 9*a* rejects the connection establishment, signals back accordingly to the UE, and discards the non-access layer (NAS) information provided in step S25.

Connected Mode

Figure 8:
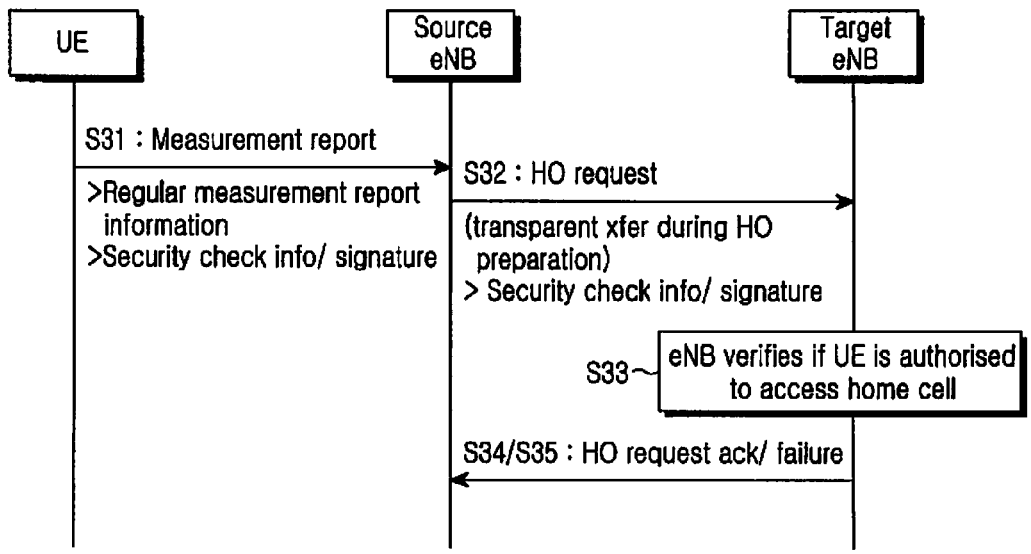
FIG. 8 is a flow diagram illustrating the signaling between a user equipment in active mode, a mobility management entity and an eNB base station forming part of the network of FIG. 1 in the second embodiment.

When the UE 1 is connected to an eNB 3*a* and is intended to handover to a home eNB 9*a*, the process is illustrated in FIG. 8.

FIG. 8 is a flow diagram illustrating the signaling between a user equipment in active mode, a mobility management entity and an eNB base station forming part of the network of FIG. 1 in the second embodiment;

In step S31, the UE provides security information within the measurement report, constituting the connection request triggering the handover to a home/private cell, to the eNB 3*a* to which it is currently connected (the source eNB).

In step S32, the network transparently transfers the security information received from the UE 1a and needed to validate the UE, from source eNB 3*a* towards the target home eNB 9*a* (either directly, or indirectly through another node) in the handover request during handover preparation. The information is in a message on which the intermediate nodes act, but included in a 'container' such that the intermediate nodes only have to forward this container to the next node. Thus this use of the container achieves transparency, avoiding impact on the intermediate nodes which don't need to act on the message.

In step 33, the home eNB 9*a* verifies whether the UE is authorized to access the home/ private cell using the security data by signaling with the UE;

If the UE is authorized in step S33, the home eNB 9*a* accepts the connection establishment in step S34 and signals back accordingly to the source eNB 3*a*. Otherwise, if the validation fails, the target home eNB 9*a* rejects the handover connection establishment in step S35 and signals back accordingly to the source eNB 3*a*. The handover is then completed conventionally.

Third Embodiment

In a third embodiment according to the present invention, a mechanism is provided for limiting the measurement reporting so that the UE 1 reports only measurements of home cells 102 which it is allowed to access. Thus, resources are not wasted when a UE 1*a* is in the vicinity of a home cell (e.g. 102*b*) which it is not authorized to use. This embodiment may be used together with the earlier embodiments, but may also be used separately thereof, so that, even if the UE 1 has taken unnecessary measurements of such cells, network capacity is not wasted by reporting them.

GSM cellular communications systems employ periodic reporting of cell measurements by the UE but, to reduce the measurement signaling load, in E-UTRA systems, measurement reporting is event-driven so that measurements are only reported on the occurrence of certain events detected by the UE. The following is a list of such event driven messages:

Event 1*a*—A Primary Common Pilot Channel (CPICH) associated with a cell enters the Reporting Range;

Event 1*b*—A Primary CPICH leaves the Reporting Range;

Event 1*c*—A Non-active Primary CPICH becomes better than an active Primary CPICH;

Event 1*d*—Change of best cell;

Event 1*e*—A Primary CPICH becomes better than an absolute threshold;

Event 1*f*—A Primary CPICH becomes worse than an absolute threshold.

Even when the UE 1 performs the measurements only when close to an accessible home/private cell as in the third embodiments of the present invention, it may trigger measurement reports frequently due to the high number of other inaccessible home/private cells (e.g. 102*b*) in the vicinity of the accessible home/private cell (e.g. 102*a*). Most of these reports are useless—the network is not interested to know that the UE changes from one inaccessible cell to another.

Accordingly, the third embodiment of the present invention defines new measurement events which include reference to the fact that the UE has checked the accessibility of the cell. The UE stores data indicating which home cells it can access. Each home cell transmits, as is known, a Tracking Area ID (TA-ID). By checking the transmitted TA-ID against those it stores for accessible home cells, the UE can check whether the measurement relates to an accessible home cell.

New measurement events are defined as "the best cell on the frequency is accessible" and "the best cell on the frequency is inaccessible."

The method according to the third embodiment of the present invention will be described with reference to FIGS. 9, 10A and 10B.

Figure 9:
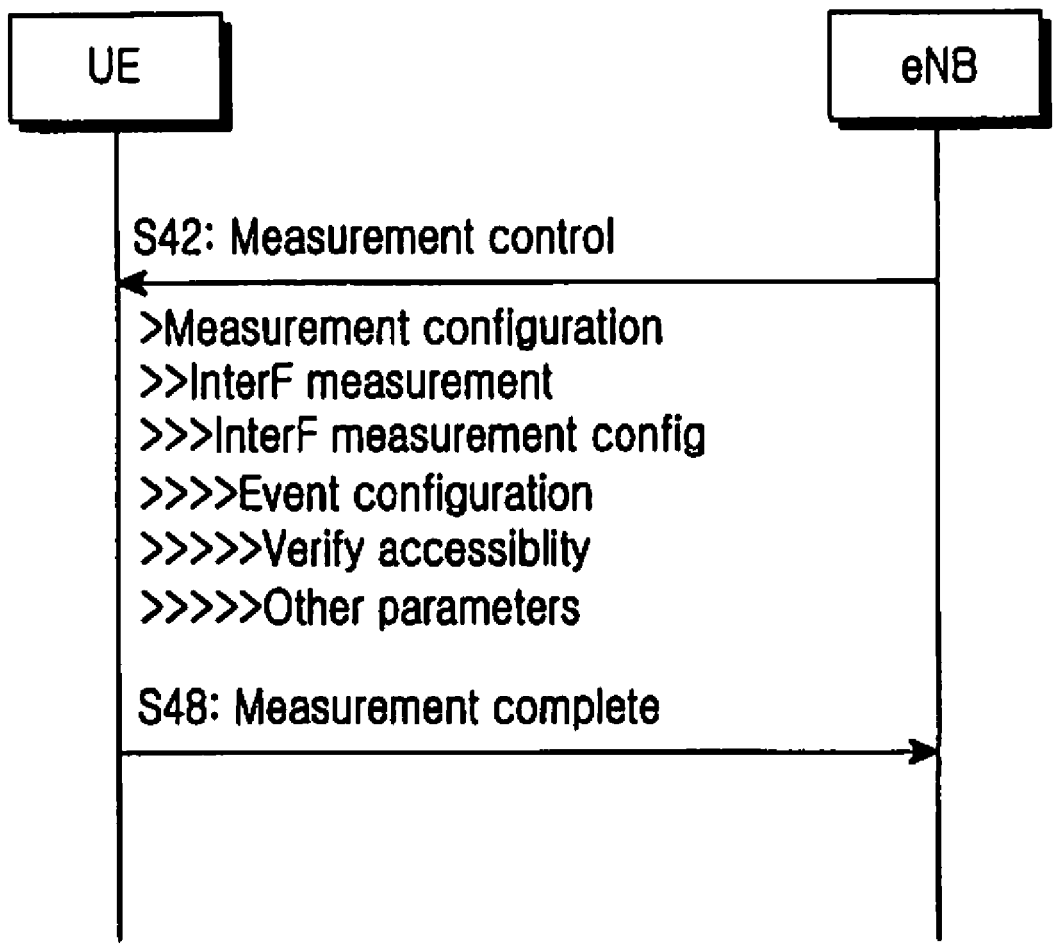
FIG. 9 is a flow diagram illustrating stages of the signaling between a user equipment and an eNB base station forming part of the network of FIG. 1 in a third embodiment of the present invention.
Figure 10A:
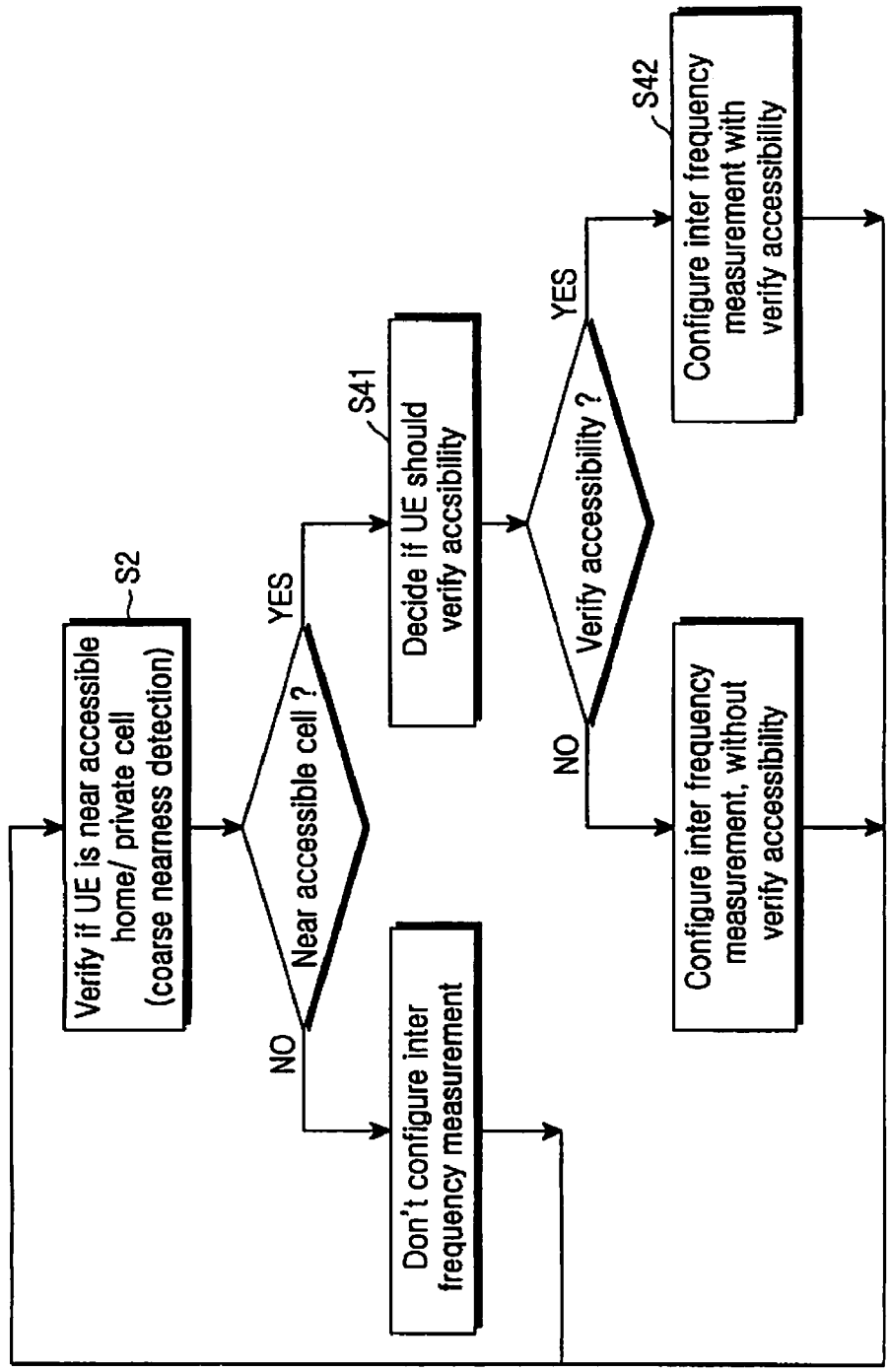
FIG. 10A is a flow chart illustrating the process performed at the eNB in the third embodiment of the present invention.
Figure 10B:
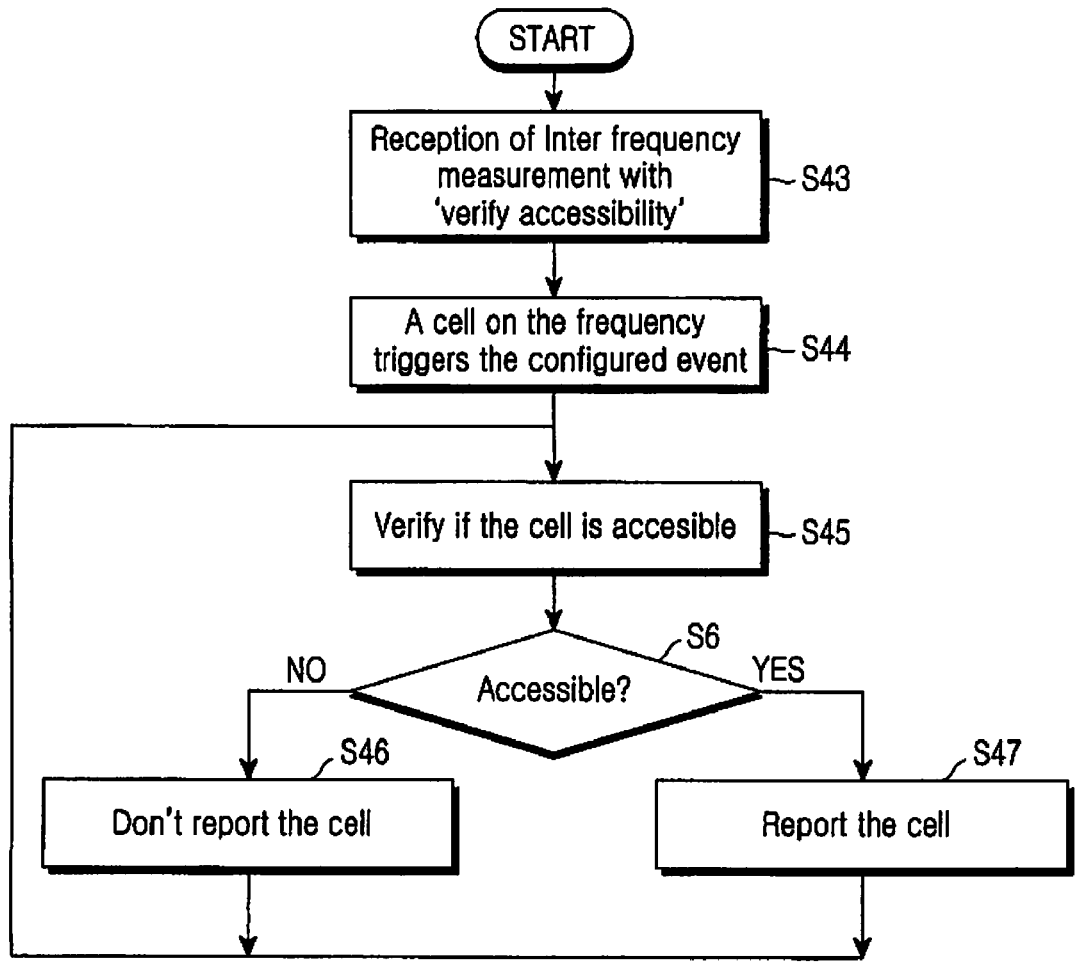
FIG. 10B is a flow chart illustrating the process performed at the user equipment in the third embodiment of the present invention.

FIG. 9 is a flow diagram illustrating stages of the signaling between a user equipment and an eNB base station forming part of the network of FIG. 1 in a third embodiment of the present invention, FIG. 10A is a flow chart illustrating the process performed at the eNB in the third embodiment of the present invention, and FIG. 10B is a flow chart illustrating the process performed at the user equipment in the third embodiment of the present invention.

Initially, the network performs step S2 as described above in relation to the first embodiment. When the EU1a is detected to be near a home cell, in step S41, the network decides whether to cause the UE to verify the accessibility of the home cell.

In step S41, the network initiates a measurement control message when it wants to setup, modify or release the measurement of neighboring cells to be performed by the UE. The measurement control message according to the third embodiment of the present invention is as shown in Table 3 below. It is transmitted from the eNB with which the EU is currently registered.

TABLE 3

| Information Element/Group name | Need | Description |
| --- | --- | --- |
| Message Type | MP | |
| RRC transaction identifier | MP | |
| Integrity check info | CH | |
| Measurement identity | MP | Identifies the measurement |
| Measurement command | MP | Indicates if the message is used to setup, modify or release a measurement |
| Measurement configuration | CV | Included in case the 'Measurement command' is set to setup or modify |
| >Inter frequency measurement | OP | |
| >>Inter frequency measurement configuration parameters | OP | E.g. event configuration |
| >>Verify accessibility | OP | Indicating if the UE should verify if the cell is accessible before reporting it |
| >Other type of measurement (s) | OP | |
| Additional parameters | OP | Additional parameters not relevant for this invention e.g. reporting mode |

More specifically, the measurement control message:

Indicates the new configuration the UE shall apply for the measurement of frequency used for home/private cells; and Includes an indication (shown in italics in Table 3) that the UE shall verify the accessibility of the cell before reporting an event related to it.

The UE receives the measurement control message in step S43, verifies the configuration included in the measurement control message, and if it accepts this it returns a measurement complete message in step S44. The response message may have the same format as shown in Table 2 above. The messages shown in the figures may be transferred via shared channels and do not require any specific use of the associated control channels.

Where the message does not include a requirement to verify the cell, the UE performs as a conventional UE, reporting the measurement messages currently defined for (E-) UTRA networks.

Where the message does include a requirement to verify the accessibility of the cell before reporting an event related to it, the UE modifies its behavior to use additional events.

For most events, the resulting behavior is straightforward as is illustrated by an example.

Reporting event 1A: A Primary CPICH enters the reporting range. Before reporting a cell on the concerned frequency the UE verifies if the cell is accessible. If not, then the event is not reported. In other words, the event becomes:

Reporting event 1A*: A Primary CPICH of an accessible cell enters the reporting range.

Reporting event 1B: A primary CPICH leaves the reporting range. Again, the UE should report 1B only for an accessible cell. Normally (though not universally), this would correspond with a cell for which it has previously reported event 1A. So, alternatively one could specify that the UE should report this only for cells that previously triggered event 1A*. However, the first option may be a little more flexible.

Reporting event 1B*: A primary CPICH of an accessible cell leaves the reporting range Reporting event 1D: Change of best cell. For this event there are two cases of interest, as mentioned before Event 1D*: An accessible cell becomes best cell on the frequency Event 1D**: An inaccessible cell becomes best cell on the frequency The first of these may trigger a handover, whereas the second should not.

Thus, in the third embodiment of the present invention, the UE monitors a plurality of cells by taking measurements. When a cell of which it has made a measurement triggers one of the events defined for (E-)UTRA networks in step S44, in each case the UE determines that cell is accessible to it in step 45 and determines whether it is accessible for communication in step S6. As a result of the determination in step S6, when it is determined that it is not accessible for communication, the UE, in many cases, avoids reporting the event corresponding to the cell measurement in step S46. As a result of the determination in step S6, when it is determined that it is accessible for communication, it is reported to the eNB 3 in step S47. In this case, the UE performs reporting only when the cell measurement meets one of the modified criteria above.

The above example shows that in this case, it is not just that the UE 1 needs to do an accessibility check, some specific rules are also needed. For example, in case of event ID** the UE 1 has to consider inaccessible cells, to report the change of best cell from an accessible one to an inaccessible one, although there seems no need to report the identity of the inaccessible cell that becomes best, or to report any subsequent changes of best cell from one inaccessible home cell to another.

Various modifications, variations and substitutions will be apparent to the skilled person. For example, it will be appreciated that the term user equipment (UE) could encompass any type of mobile station including cellular phones, cordless phones and personal digital assistants (PDAs), or a fixed station. The term base station likewise could encompass any terrestrial, aerial or orbiting cellular repeater.

For exemplary purposes, the embodiments of the invention have been described in the context of, and using terminology associated with, the UTRA scheme (i.e. HSPA scheme). It will be appreciated that the invention can also be implemented in other types of wireless (e.g. radio) communication scheme. In general, the wireless communication system will include a wireless access network which includes a number of base stations which communicate with mobile stations using wireless links.

Although a separate frequency for home cells is preferred, aspects of the invention will operate irrespective of the frequency or channels allocated to home cells.

Instead of GPS, the UE may be equipped with other fine positioning measurement systems, such as those based on cell triangulation from signals broadcast by eNBs, or any other suitable positioning system.

A measurement control message could include multiple 'measurement commands' i.e. the setup of one measurement, the release of another and/or the modification of a third.

Likewise, the measurement configuration could include several other types of measurements e.g. intra frequency measurements, UE internal measurements.

Although the third embodiment above employs event based reporting, similar principle may be applied for periodic measurement reporting as in GSM.

Although the third embodiment above employs Tracking Areas for accessibility checking, any other broadcast signal or signal characteristic of a home cell could be used. A list of non-accessible home cells could be stored by the UE instead of a list of accessible home cells.

The present invention may be implemented by changing the software routines implemented by existing hardware. As such, the invention also extends to computer programs, particularly computer programs on or in a carrier, adapted for putting the invention into practice. The program may be in the form of source code, object code, a code intermediate to source code and object code such as in partially compiled form, or in any other form suitable for using in the implementation of the processes according to the invention.

The carrier may be any entity or device capable of carrying the program. For example, the carrier may comprise a storage medium, such as a ROM, for example a CD-ROM or a semiconductor ROM, or a magnetic recording medium, for example a floppy disc or a hard disc, or an optical recording medium. Further, the carrier may be a transmissible carrier such as an electronic or optical signal which may be conveyed to the UE or a network component via electrical or optical cable or by radio or other means.

The carrier may be an integrated circuit in which the program is embedded, the integrated circuit being adapted for performing, or for use in the performance of, the relevant processes.

The invention therefore extends not only to the above-described embodiments but to all such modifications, variations and substitutions which would be apparent to the skilled person in the light of the foregoing.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. In a mobile telecommunications system comprising: a network including a plurality of base stations for defining communications cells; and first and second user equipments for communicating with the network, the plurality of base stations including at least one home base station defining a home cell associated with the first user equipment and not with the second user equipment, the home cell overlapping in coverage with a communications cell usable by both the first and second user equipments, a method for measuring a home cell comprising the steps of:

acquiring, at the network, position data indicative of the position of the first user equipment;
determining whether the first user equipment is close to the home cell by using the acquired position data;
sending a cell measurement control message from the network to the first user equipment via a base station specifying measurements of the home cell when the first user equipment is close to the home cell;
performing, at the first user equipment a fine position measurement;
determining at the first user equipment whether the first user equipment is close to the home cell, based on the fine position measurement; and
taking measurements of the home cell at the first user equipment when the first user equipment is close to the home cell.

2. The method as claimed in claim 1, wherein the position data comprises the first user equipment being in contact with a cell that overlaps the home cell.

3. The method as claimed in claim 1, wherein the position data comprises the first user equipment being registered in a tracking area that overlaps the home cell.

4. The method as claimed in claim 1, wherein the position data comprises the first user equipment being within a geographical area that overlaps the home cell.

5. The method as claimed in claim 1, wherein the fine position measurement comprises a satellite navigation measurement.

6. The method as claimed in claim 1, wherein said home cell operates on a frequency unused by other network cells.

7. The method as claimed in claim 1, wherein the control message is a message specifying a frequency to be measured, and includes indication representing if a home cell frequency is measured according to a user equipment.

8. In a mobile telecommunications system comprising: a network including a plurality of base stations for defining communications cells; and first and second user equipments for communicating with the network, the plurality of base stations including at least one home base station defining a plurality of home cells, at least one associated with the first user equipment and not with the second user equipment, the home cell overlapping in coverage with a communications cell usable by both the first and second user equipments, a method for measuring a home cell comprising the steps of:

acquiring position data indicative of the position of the first user equipment;
determining whether the first user equipment is close to the home cell by using the acquired position data;
sending a measurement control message from the network to the first user equipment via a base station relating to the home cell when the first user equipment is close to the home cell; and
taking measurements of the home cell at the first user equipment in dependence on a received measurement control message;
wherein, on setting up or transferring to a base station a session involving the first user equipment, position information on the position of the home cell within the area of the communication cell generated by that base station is sent to the base station.

9. The method as claimed in claim 8, wherein the home cell operates on a frequency unused by other network cells.

* * * * *